United States Patent
Cadima et al.

(10) Patent No.: US 9,115,901 B2
(45) Date of Patent: Aug. 25, 2015

(54) GAS OVEN EXHAUST VENT DAMPER SYSTEM

(75) Inventors: Paul Bryan Cadima, Prospect, KY (US); James Carter Bach, Seymour, IN (US); Bai Han, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1032 days.

(21) Appl. No.: 13/191,553

(22) Filed: Jul. 27, 2011

(65) Prior Publication Data

US 2013/0025582 A1    Jan. 31, 2013

(51) Int. Cl.
*F24C 15/32*    (2006.01)
*F24C 3/12*    (2006.01)
*F24C 15/00*    (2006.01)
*G05D 23/185*    (2006.01)
*F23N 5/04*    (2006.01)

(52) U.S. Cl.
CPC ............. *F24C 3/128* (2013.01); *F24C 15/001* (2013.01); *G05D 23/1854* (2013.01)

(58) Field of Classification Search
CPC .................................. F24C 15/32; F23N 5/04
USPC ........ 126/288, 289, 77, 61, 15 R, 21 R, 41 R; 236/96
See application file for complete search history.

(56) References Cited

U.S. PATENT DOCUMENTS

| | | | |
|---|---|---|---|
| 3,134,377 A * | 5/1964 | Kanoy | 126/504 |
| 3,419,428 A | 12/1968 | Welch | |
| 3,507,265 A * | 4/1970 | Dills et al. | 126/21 R |
| 3,624,742 A | 11/1971 | Hurko et al. | |
| 3,951,335 A * | 4/1976 | Kemp | 236/15 A |
| 4,409,956 A * | 10/1983 | Barnett | 126/290 |
| 4,598,691 A * | 7/1986 | Herrelko et al. | 126/41 R |
| 4,802,459 A * | 2/1989 | McFadden et al. | 126/41 R |
| 4,831,225 A | 5/1989 | Ishifuro et al. | |
| 6,041,770 A * | 3/2000 | Erickson | 126/77 |
| 8,776,776 B2 * | 7/2014 | Todd et al. | 126/39 R |
| 2011/0094496 A1 * | 4/2011 | McCown | 126/289 |

* cited by examiner

*Primary Examiner* — Gregory Huson
*Assistant Examiner* — Nikhil Mashruwala
(74) *Attorney, Agent, or Firm* — Dority & Manning, P.A.

(57) ABSTRACT

A damper system for an exhaust vent of a gas operated oven includes a temperature-reactive member configured to expand when actuated by heating to a predetermined temperature, and a damper member coupled to the temperature-reactive member, the damper member configured to move with the expansion of the temperature-reactive member to control a size of an opening to the exhaust vent from the gas operated oven.

12 Claims, 7 Drawing Sheets

GAS OVEN EXHAUST VENT DAMPER SYSTEM

BACKGROUND

The present disclosure generally relates to a gas range system, and more particularly to an improved exhaust vent system for a gas oven.

Conventional gas operated cooking appliances such as gas ovens, for example, have one or more burners in which gas is mixed with air and burned. These types of ovens are heated by burning gas, either natural gas or vaporized liquid petroleum gas. Fresh air is drawn in through burner units that mix the gas with the air for combustion. The gaseous products of combustion must be discharged or otherwise escape from the oven cavity.

Typically, a gas oven will include a gas burner located in the bottom portion of the oven that is used for general baking and cooking. This burner will generally be referred to as a bake burner. The gas oven can also include a gas burner at the top of the oven, which is generally referred to as a broil burner. Both the bake burner and the broil burners are generally open flame types of gas burners.

During heating of the gas oven, there is a continual supply of gas and air that is combusted. The gaseous products of combustion are normally vented to the atmosphere. For example, some gas ovens include a venting system that vents the gaseous products through a vent in the upper rear portion of the oven cavity that extends through the upper wall or rear wall of the oven and into the kitchen or out through a duct.

Generally, a worst case condition for clean combustion in a gas oven having both a bake burner and a broil burner is during the broil mode. As the broil burner is located near the top of the oven cavity, there is less stack height to develop and drive air flow through the oven cavity and into the vent. Another worst case condition for a gas oven is when the gas oven is cold and first activated. Due to the cool initial temperature in the interior of the oven, stack pressure sufficient to drive air flow through the oven cavity builds slowly during the warm-up period. Also, other variables such as quenching of cold surfaces on the burner flames can result in higher amounts of emissions during the warm-up period.

To compensate for the reduced stack height for the broil burner or the reduced stack pressure during the warm-up period of the gas oven, the exhaust vent cross-sectional area will typically be oversized. In some cases, the vents can be at least twice the size they need to be for most usage. Although a larger vent size may improve combustion for broil and warm-up conditions, the larger vent size also means that for the other operating conditions, the oven will not be as efficient as it could be with a smaller vent. Also, an oversized vent can allow excess heat to vent out of the oven. Thus, a one-size vent cannot provide optimum performance for all of the operating conditions of the oven.

Accordingly, it would be desirable to provide a system that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a damper system for an exhaust vent of a gas operated oven. In one embodiment, the damper system includes a temperature-reactive member configured to control a size of an exhaust vent opening to the exhaust from the gas operated oven.

Another aspect of the disclosed embodiments relates to a gas oven. In one embodiment, the gas oven includes an oven cavity, a gas burner assembly disposed within the oven cavity, and an exhaust vent communicatively coupled to the oven cavity, where the exhaust vent includes an opening to allow flue gas to be vented from the oven cavity through the exhaust vent. A temperature actuated damper device is disposed proximate to the exhaust vent opening and is configured to change a size of the opening as a function of a temperature associated with the operating condition of the oven.

A further aspect of the disclosed embodiments relates to a damper system for an exhaust vent of a gas operated oven. In one embodiment, the damper system includes a temperature-dependent actuator, a damper member coupled to the temperature-dependent actuator, the temperature-dependent actuator configured to control a size of an opening to the exhaust vent by moving the damper member.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
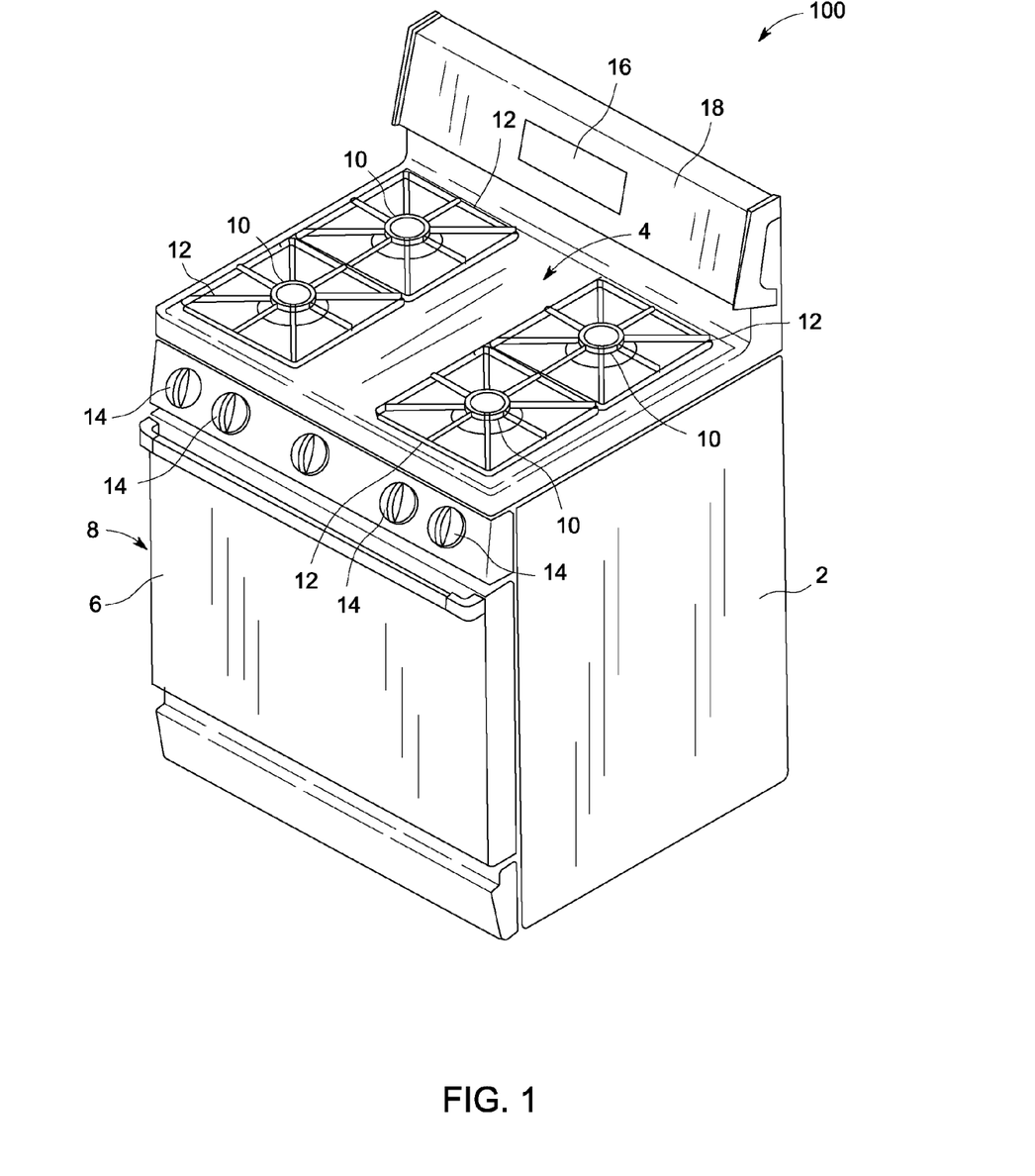
FIG. 1 is a perspective view of an appliance incorporating aspects of the disclosed embodiments.

Referring to FIG. 1, an exemplary cooking appliance, such as a free-standing gas range, incorporating aspects of the disclosed embodiments, is generally designated by reference numeral 100. The aspects of the disclosed embodiments are directed to improving the efficiency of a gas operated oven by reducing heat losses through the oven vent while meeting the proper combustion and ventilation needs of the oven during cold start and steady state operation. Although the aspects of the disclosed embodiments will generally be described herein with respect to a vent system for a range incorporating a gas operated oven, the aspects of the disclosed embodiments can also be applied to other gas operated ovens where combustion gases need to be vented.

The appliance 100 shown in FIG. 1 generally includes an outer body or cabinet 2 that incorporates a substantially rectangular cooktop 4. In one embodiment, an oven 8 can be positioned below the cooktop 4 which can include a front-opening access door 6. The cooktop 4 shown in FIG. 1 includes four gas fueled burner assemblies 10 that are positioned in a spaced apart relationship. In alternate embodiments, the cooktop 4 can include any number of gas fueled burner assemblies 10 arranged in any suitable configuration. Each burner assembly 10 generally extends upwardly through an opening in the cooktop 4, and a grate 12 can be positioned over each burner assembly 10. Each grate 12 can include horizontally extending support structures thereon for supporting cooking vessels. Although the gas burner assemblies 10 are shown in FIG. 1 as being substantially similar, in alternate embodiments, the gas burner assemblies 10 can be of different sizes to accommodate different sized cooking vessels.

The cooktop 4 can also include one or more control devices, such as knobs 14 that are manipulated by the user to adjust the setting of a corresponding gas valve to control the amount of heat output from the corresponding burner assembly 10. Although the control devices are generally described herein as knobs, in alternate embodiments, the control device can comprise any suitable control mechanism, such as for example, a slidable switch or electronic control.

The appliance 100 can also include a control panel and/or display 16 mounted on or in a backsplash 18. In one embodiment, one or more of the control knobs 14 can be located on the backsplash 18. A controller (not shown) can be coupled to the control panel 16. In one embodiment, the control panel 16 can include switches or controls (not shown) that can be used to control one or more functions of the appliance 100.

Figure 2:
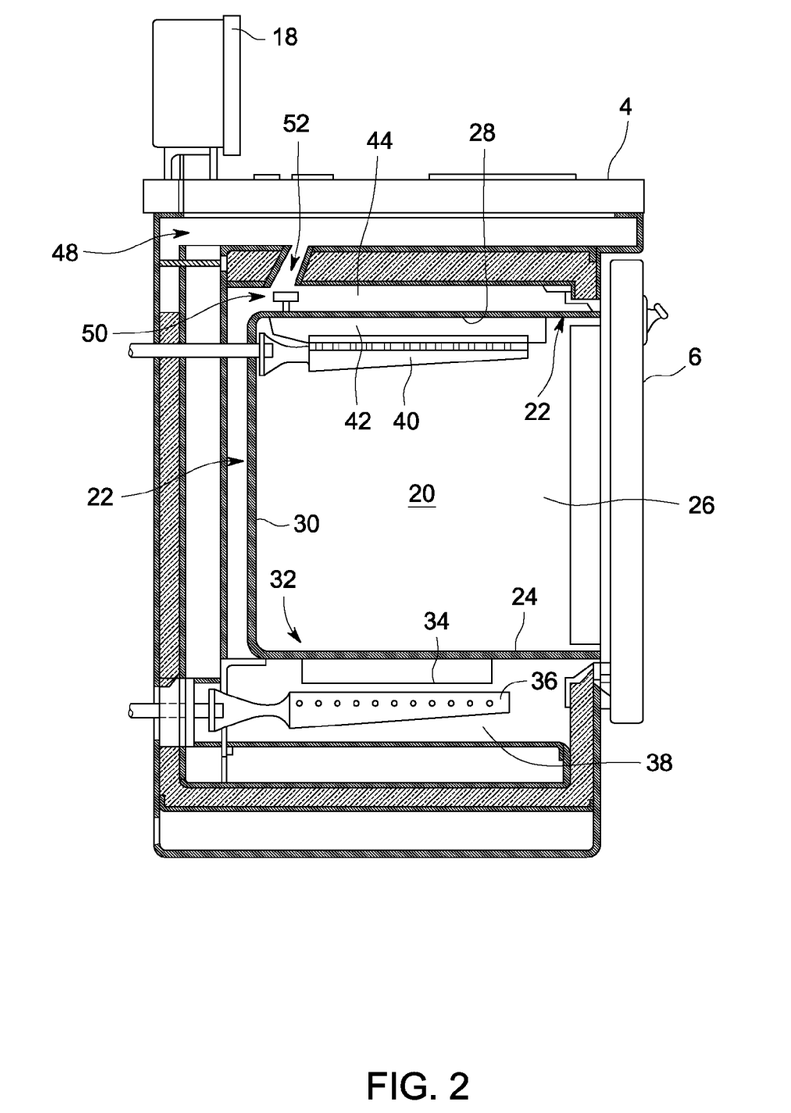
FIG. 2 is a left side cross-sectional view of the appliance of FIG. 1.

FIG. 2 is a left side cross-sectional view of the appliance 100 shown in FIG. 1. As shown in FIG. 2, the oven 8 includes an oven cavity 20. The oven cavity 20 is formed from a boxlike oven liner 22 in combination with the front-opening access door 6. The oven liner 22 includes a bottom wall 24, opposing vertical sidewalls 26, a top wall 28 and a rear wall 30.

The bottom wall 24 of the oven liner 22 is formed with a rectangular opening 32, which is configured to be covered by a removable cover plate or flame spreader 34. The cover plate 34 enables access to a bake burner 36 which is located in a combustion chamber 38 beneath the bottom wall 24 of the oven liner 22.

An upper gas burner, or broil burner 40 is disposed at the top of the oven cavity 20 for use during broiling operations of the oven 8. A flame spreader 42 is typically disposed above the broil burner 40.

As will be generally understood, the bake burner 36 is used during baking operations of the oven 8 and for raising the temperature of the oven cavity 20 to various levels in the range of approximately 150 degrees Fahrenheit to and including 550 degrees Fahrenheit. The broil burner 40 is used during broil operations and can be used to raise the temperature of the oven cavity 20 in a known manner. Temperatures at or near the broil burner 40, while it is active, can be in the range of approximately 1000 up to and including 1100 degrees Fahrenheit.

The gaseous emissions generated by the gas burners 36 and 40 during combustion are generally referred to herein as "flue gases", as that term is generally known and understood in the art. In one embodiment, the direction of flow of the flue gases from the bake burner 36 tend to be within the oven cavity 20, around or past the broil burner 40 and the flame spreader 42 and out the exhaust vent 48. In alternate embodiments, the flow of flue gases can be in any suitable direction. In order to allow the flue gases to escape the oven cavity 20, the exhaust vent 48 is provided in the top wall 28 of the oven liner 22. In alternate embodiments, the exhaust vent 48 can be disposed in the back wall 30 of the oven cavity. The exhaust vent 48 is generally configured to vent the flue gasses out of the oven cavity 20 to the external environment.

For efficient operation, due to its limited stack height the broil burner 40 requires a larger vent opening than that required for the bake burner 36 under steady state operating conditions. Similarly, when warming up from a cold oven condition, a larger vent opening for the bake burner than that required for efficient steady state operating conditions is desirable for cleaner combustion during the warm up period. For example, in order to accommodate both cold start combustion, and steady state operation of the broil burner 40, the cross-sectional area of the exhaust vent 48 is typically sized to be twice what might normally be required for steady state operation of the bake burner 36. Such an arrangement works well for broil and cold start operating conditions, but compromises energy efficiency when operating in steady state bake burner only modes, which typically constitute the majority of the operation time for domestic gas ovens.

The aspects of the disclosed embodiments are generally directed to controlling the size of the vent opening for venting of the flue gases depending on the operational mode of the oven 8. A vent and damper arrangement is provided in which the damper is selectively movable between a first position which provides a first vent opening size and a second position which provides a second vent opening size. The first size is the maximum size, which is selected to provide in one instance efficient broiler combustion or alternatively to provide for cleaner combustion during the warm-up mode for a cold oven. The second size, less than the first size, is selected to provide efficient combustion for the bake element under steady state baking conditions. In the illustrative embodiments, the first size is 100% of the vent physical fully open vent opening and the second size is approximately 50% of the first size. Table 1 below provides a general indication of typical vent states required for the operational states of the bake and broil burners 36, 40, to ensure proper combustion.

TABLE 1

| Mode | Bake Burner Active | Broil Burner Active | Vent State Initially | Vent State After ~30 Seconds | Vent State at Peak of Heat up Stage | Benefit |
| --- | --- | --- | --- | --- | --- | --- |
| Standard Preheat | X | | 50% Open | 50% Open | 50% Open | Reduced Heat Waste, Faster Preheats |
| Bake | X | | 50% Open | 50% Open | 50% Open | Same as Standard Preheat |
| Broil | | X | 50% Open | 100% Open | 100% Open | Vent enlarges to compensate for Broil venting needs |

Referring to FIG. 2, in one embodiment, a damper system 50, schematically shown in FIG. 2, is used to control a size of an opening 52 to the exhaust vent 48. The damper system 50 is used to adjust the effective cross-sectional area of the opening 52, and thus the flow of flue gas through the exhaust vent 48. In this embodiment, the damper system 50 generally comprises a temperature sensitive material such as a shape memory alloy that changes shape in response to changes in temperature. One example of a shape memory alloy is a bimetal device or bimetallic strip. As is known in the art, a bimetal device generally comprises two separate and dissimilar metals that are joined together. The two dissimilar metals will expand at different rates as they are heated, and the bimetal device converts a temperature change into a mechanical displacement. Typically, the bimetal device will curl or straighten due to differential expansion.

The damper system 50 is configured to increase or enlarge the area or size of the vent opening 52 to compensate for the venting needs of a broil mode or operation of the broil burner 40. As is shown in Table 1, during operation of the broil burner 40, the state of the vent opening 52 after a period of active operation, is roughly 100% open. In one embodiment, this time period can be approximately 30 seconds. In alternate embodiments, any suitable time period can be used. It is understood in this example that the cross-sectional area of the exhaust vent 48 is sized to be approximately double that required for a standard pre-heat or bake operation.

Figure 3:
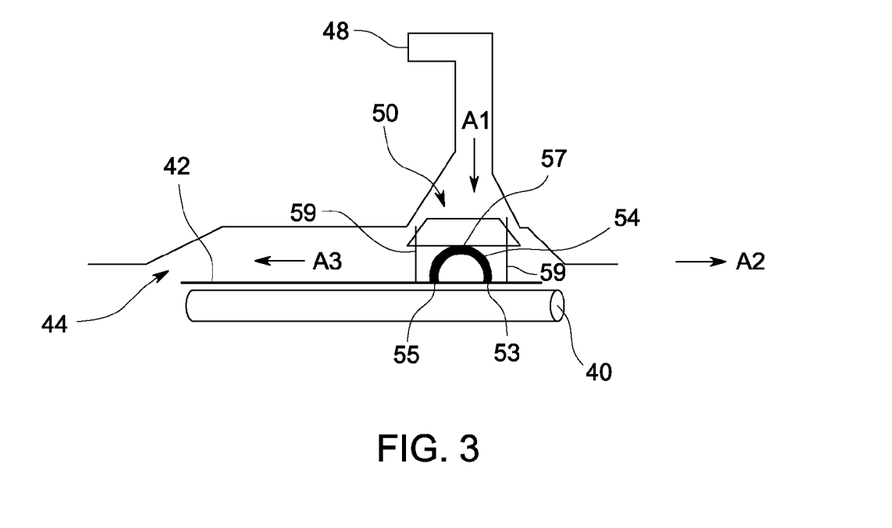
FIG. 3 illustrates an exemplary damper system incorporating aspects of the disclosed embodiments.

FIG. 3 illustrates an embodiment of the damper system 50 that can be used to increase the cross-sectional area of the vent opening 52 during operation of the broil burner 40. In order to expand the effective vent area when the broil burner is operating, but not when only the bake burner is operating, the damper system is designed to respond to a temperature that only occurs when the broil burner is operating. As previously described, the bake burner 36 is used during baking operations of the oven 8 to raise the temperature of the oven cavity 20 to various levels in the range of approximately 150 degrees Fahrenheit to and including 550 degrees Fahrenheit. However, during broil operations surface temperatures at or near the broil burner 40, such as the surface temperature of the flame spreader 42, can be in the range of approximately 1000-1100 degrees Fahrenheit. In this example, the damper system 50 is thermally coupled to the flame spreader 42 above the broil burner 40 to take advantage of the large temperature difference between the temperature of the oven cavity 20 and the area near the broil burner 40 and flame spreader 42 to actuate the damper system 50 when the broil burner 40 is active, rather than just using the overall temperature of the oven cavity 20.

In the example shown in FIG. 3, damper system 50 comprises a bimetal device or strip 54 and a damper member or plate 56. The bimetal device 54 is coupled to the broil burner flame spreader 42 in such a way that the bimetal device 54 actuates the damper member 56 in a temperature range that is realized only when the broil burner 40 is active. A damper plate 56 is communicatively coupled to the side of the bimetal device 54 opposite the flame spreader 42. The damper plate 56 can generally comprise a heat resistant member, such as a metal plate, that can be used to control or change a size of the vent opening 52 to control the flow of flue gas through the exhaust vent. When the surface temperature of the flame spreader 42 where the bimetal is coupled to the flame spreader, reaches a predetermined level, such as for example, approximately 850 degrees Fahrenheit, the reaction of the bimetal moves the damper plate 56 from a second position to a first position to expand or increase the size of the opening 52 to the exhaust vent 48.

In one embodiment, when the damper plate 56 is in its second position, the effective cross-sectional area of the opening 52 is generally suitable for steady state combustion for the bake burner 36, or referring to Table 1, operation of the oven when a state of the vent opening 52 needs to only be roughly 50% open. In its first position, the damper is sufficiently removed from the vent opening to allow the vent to be fully open, which is the 100% open state in Table I, which is sized to enable efficient combustion for the broil burner 40.

As shown in FIG. 3, as the bimetal device 54 is actuated by an increase in temperature, the mechanical displacement of the bimetal device 54 is generally indicated by the arrow A1. The damper plate 56, which can be secured to or is resting on the top portion 57 of the bimetal device 54, is generally configured to move in the direction A1 due to the expansion of the bimetal device 54. In this example, the bimetal device 54 is a bimetallic strip having a nominal or non-actuated shape that is substantially curved, or in the form of a half moon or arch. The term "actuated", as is used herein with respect to the bimetal device 54, means a state where the bimetal device 54 is exposed to a sufficient temperature or temperature range that cause the bimetal device 54 to expand, or tend to straighten from the curved shape. In the example of FIG. 3, the expansion of the bimetal device 54 causes the ends 53, 55 of the bimetal device 54 to move outwardly, generally in the directions indicated by the arrows A2, A3, respectively. As the ends 53, 55 move outwardly, the top portion 57 of the bimetal device 54 generally moves in the direction indicated by arrow A1 increasing the effective cross-sectional area of the vent opening. In one embodiment, the damper plate 56 is fixedly secured to the top portion 57 of the bimetal device 54. In alternate embodiments, the damper plate 56 can be configured to move with the bimetal device 54 in any suitable manner.

The shape of the bimetal device 54 in a non-actuated state can be any suitable shape that will cause the damper plate 56 to move in a manner that enlarges the effective cross-sectional area of the exhaust vent 48 when the bimetal device 54 is actuated. For example, in one embodiment, the orientation of the bimetal device 54 shown in FIG. 3 can be flipped upside down, with the top portion fixedly secured or adjacent to the flame spreader 42, and the ends 53, 55 in contact with, or otherwise supporting the damper plate 56. In this configuration, as the bimetal device 54 is actuated by the increasing temperature of the flame spreader 42, and tends to straighten out, the legs 53, 55 will again move in outward directions, indicated by arrows A3, A2, respectively. The damper plate 56 will lower, moving away from the opening 52, which generally increases the effective cross-sectional area of the vent opening 52, allowing an increased flow of flue gas to the exhaust vent 48.

In one embodiment, the damper plate 56 is slidingly retained by pins 59, which can be secured to, for example, the flame spreader 42, or the walls of the heating channel 44, or exhaust vent 48. The pins 59 securely retain the damper plate 56 in a position above the flame spreader 42, and allow the damper plate 56 to move up and down with the changes in shape of the bimetal device 54. In the non-actuated state of the bimetal device 54, the damper plate 56 is positioned at a second position within or near the vent opening 52, so that a state of the exhaust vent 48 is in the roughly 50% open state described in Table 1. In the actuated state, which in the illustrative embodiment occurs after approximately 30 seconds of broil burner operation, which is the time required for the broil burner to heat the flame spreader to the predetermined actuating temperature, the bimetal device 54 expands to move the damper plate 56 to a first position within the vent opening 52 so that the state of the exhaust vent 48 is roughly 100% open.

In one embodiment, the bimetal device 54 is actuated when the broil burner flame spreader 42 is heated to a temperature of at least 850 degrees Fahrenheit. When the broil burner 40 is deactivated, and the bimetal device 54 cools, the mechanical displacement of the bimetal device 54 is in a direction opposite to that indicated by arrow A1, thus moving the damper plate 56 back to its second position restricting the effective area of, the vent opening 52 to an approximately 50% open state.

Since the bimetal device 54 is only actuated when the broil burner 40 is active, the damper system 50 of this embodiment expands the effective venting for the broil burner 40 only when the additional venting is needed, for broil burner operation.

Figure 4:
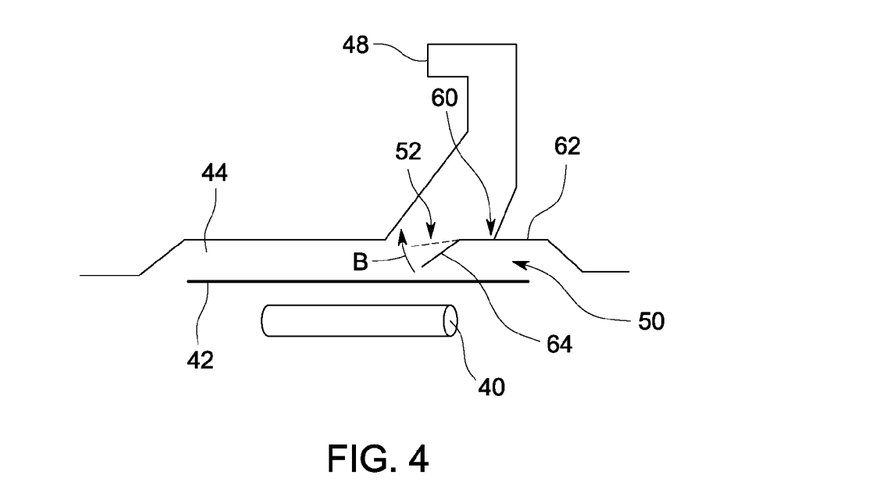
FIG. 4 illustrates an exemplary damper system according to another embodiment of the disclosure.

FIG. 4 illustrates an example of a damper system 50 incorporating aspects of the disclosed embodiments configured to control vent size to compensate for cold oven starts by reducing the cross-sectional area of the exhaust vent to an approximately 50% open state when a steady combustion condition for the bake burner has been reached. In this example, the damper system 50 comprises a bimetal member 60 that is positioned within a heating channel 44 of the oven 8 near the vent opening 52. Although the example shows the bimetal member 60 near the vent opening 52, in alternate embodiment, the bimetal member 60 can be located at any suitable position within the heating channel 44 or exhaust vent 48 that will allow the bimetal member 60 to restrict the flow of flue gases through the vent opening 52 and exhaust vent 48 as is described herein.

In the example illustrated in FIG. 4, the maximum vent size is selected to provide relatively clean combustion for the bake burner when heating up from a cold start. In a non-actuated state of the bimetal member 60, the state of the exhaust vent 48 is roughly 100% open. Bimetal member 60 is configured such that in the actuated state, at least a portion 64 of the bimetal member 60 is extends into, and restricts the effective cross-sectional area of the vent opening 52 of the exhaust vent 48. Once the temperatures in the oven cavity 20 have risen to a pre-determined level indicative of steady state operating conditions, the damper system will at least partially restrict the venting of the flue gases to improve the steady state efficiency of the appliance 100, by reducing the size of the exhaust vent opening 52 and limiting a volume of the combustion gas and heat being allowed to vent from the oven cavity 20. In this example, the damper system 50 is configured to restrict a size of the vent opening 52 when the temperature sensed by bimetal member 60, for example the temperature of the flue gas proximate the vent opening reaches a temperature that is greater than approximately 350 degrees Fahrenheit.

As shown in FIG. 4, one end 62 of the bimetal member 60 is fixed in place and can be attached to, for example, a wall of the heating channel 44 or vent 48, and is generally referred to as the fixed end 62. The other end 64 is configured to extend at least partially into or across the vent opening 52 in the engaged state of the bimetal member 60. The end 64 can generally be referred to as the free or movable end 64.

The damper system 50 shown in FIG. 4 is configured as a normally open device, meaning that when the bimetal member 60 is not actuated, the movable end 64 of the bimetal member 60 does not substantially restrict the size of the vent opening 52, allowing the state of the exhaust vent 48 to be considered roughly 100% open. When the bimetal member 60 is actuated in response to sensing a temperature range realized only when the oven cavity 20 is heated adequately to support efficient steady state bake burner operation, the end 64 of the bimetal member 60 is configured to move or extend towards and into the area encompassed by the vent opening 52. As the movable end 64 extends into the exhaust vent 48, the size of the vent opening 52 is restricted. The movement or extension of the movable end 64 caused by the expansion of the bimetal device 60 is generally in the direction indicated by the arrow B, from the normally open first position to a second position corresponding to the 50% open state of the exhaust vent 48.

Figure 5:
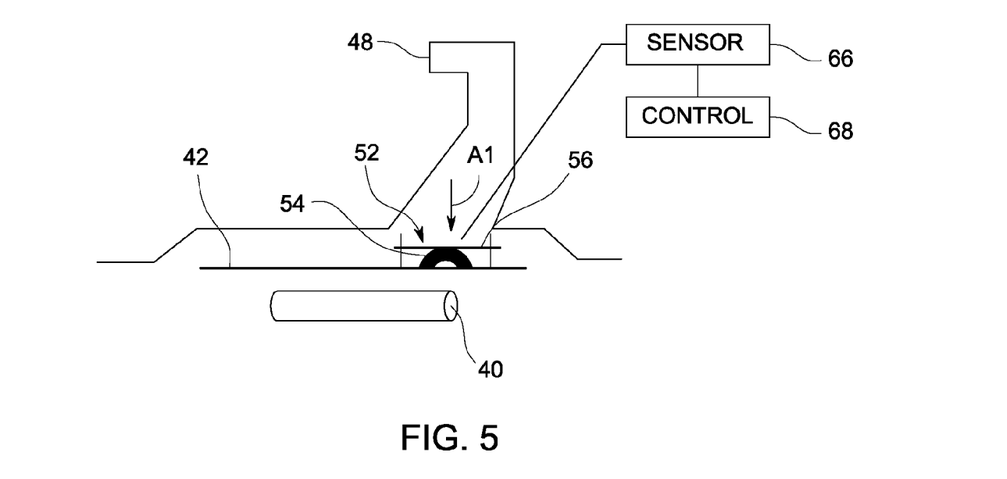
FIG. 5 illustrates an exemplary damper system according to a further embodiment of the disclosure.

In one embodiment, referring to FIG. 5, the aspects of the disclosed embodiments can include a position sensor 66 that is generally configured to detect and/or determine a position of the damper member or plate 56. A controller 68 can receive the position information from the position sensor 66 and enable or disable the broil burner 40. When operation of the broil burner 40 is called for and after approximately 30 seconds the controller 68 determines that the damper plate 56 is not in a position that allows the state of the exhaust vent to be approximately 100% open, the controller 68 can terminate the heating cycle. In one embodiment, the controller 68 can comprise or activate an interlock switch that prevents gas from flowing to the respective burners. The actions of the controller 68 could also include providing suitable warnings or fault indications to the user to indicate the condition. The aspects of the disclosed embodiments add additional robustness to the oven 8 in case the damper system 50 fails to be in the proper position for combustion when heat is called for any one of the cycles referred to in Table 1. Although this example is described with respect to the damper plate 56 shown in FIG. 5, this aspect of the disclosed embodiments could be equally applied to the embodiment shown in FIG. 4, as well as those described with respect to FIGS. 6-10.

The position sensor 66 can generally include any suitable sensor or switch that is configured to detect a position or state of the damper member 56. For example, in one embodiment, the sensor 66 is one or more of a mechanical, electrical, electronic or photoelectric switch, a potentiometer, strain gage, optical linear encoder, optical rotary encoder, magnetic rotary encoder, magnetic linear encoder (LVDT), ultrasonic (sonar) or laser interferometer. In alternate embodiments, any suitable switch that can detect a position of a damper member in an oven can be utilized. The controller 68 generally comprises an analog or digital circuit, and can include one or more processors or microcontrollers that are configured to execute a software algorithm.

Figure 6:
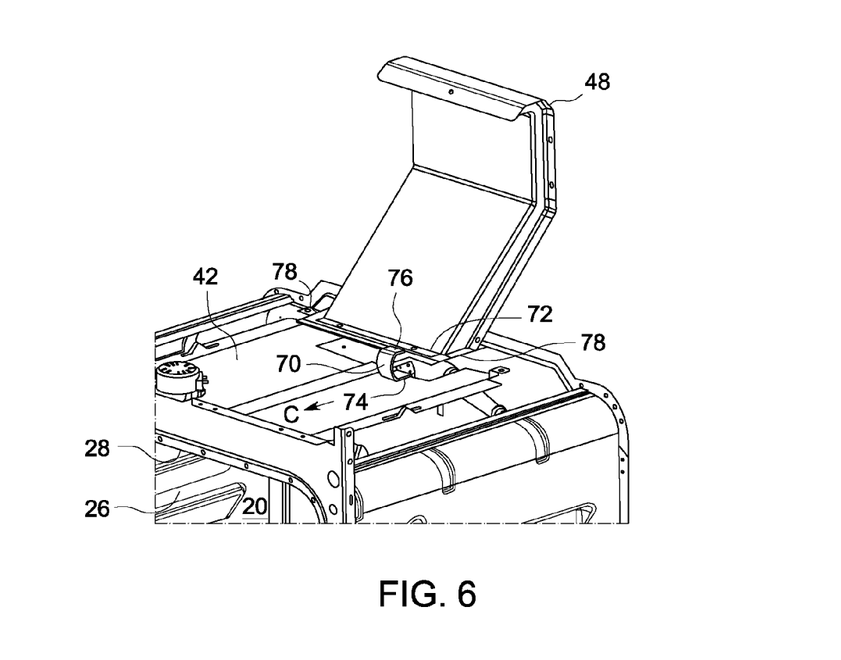
FIG. 6 illustrates an exemplary damper system according to an embodiment of the disclosure.

FIG. 6 illustrates another exemplary damper system 50 incorporating aspects of the disclosed embodiments. In this example, the damper system 50 includes a bimetal device or member 70 and a shutter member 72. The bimetal member 70 shown in FIG. 6 is in the form of a leaf spring, with one end 74 fixedly secured in the oven cavity 20 and the other end 76 secured to the shutter member 72. In alternate embodiments, the bimetal member 70 can take any suitable form that allows it to move the shutter member 72 when the bimetal member 70 is engaged. The end 74 of the bimetal member 70 is secured in place, and does not move relative to the other end 76. In one embodiment, the end 74 is secured to the flame spreader 42, the heating channel 44 or such other suitable portion of the oven 8, oven cavity 20 or exhaust vent 48 that will allow the bimetal member 70 to be thermally coupled with either of the flame spreader 42 or heating channel 44, depending upon whether the system is for adjusting the vent size for broiling (embodiment of FIGS. 3 and 5, or for optimizing for cold starts, embodiment of FIG. 3), as is described herein. Generally, the manner of securing the end 74 can include any suitable retention means, including, for example, welding, bolting, riveting or nut and bolt arrangement.

In the example shown in FIG. 6, the bimetal member 70 is thermally coupled to the flame spreader 42 for enlarging a size of the vent opening 52 shown in FIG. 2 when the broil burner 40 of FIG. 2 is active to compensate for the venting needs to support the operation of broil burner 40, referring again to Table 1. In alternate embodiments, the bimetal member 70 can be thermally coupled to the heating channel 44 for restricting or throttling back a size of the vent opening 52 once the oven cavity 20 has heated adequately.

The shutter member 72 generally comprises a heat resistant material, such a metal plate. In one embodiment, the shutter member 72 is slidably retained in channels or grooves 78 along the opening 52 of the exhaust vent or other suitable structure of the oven cavity 20 or oven 8. As the bimetal member 70 tends to expand, the expansion will cause the end 76 of the bimetal member to generally move in the direction C.

Figure 8:
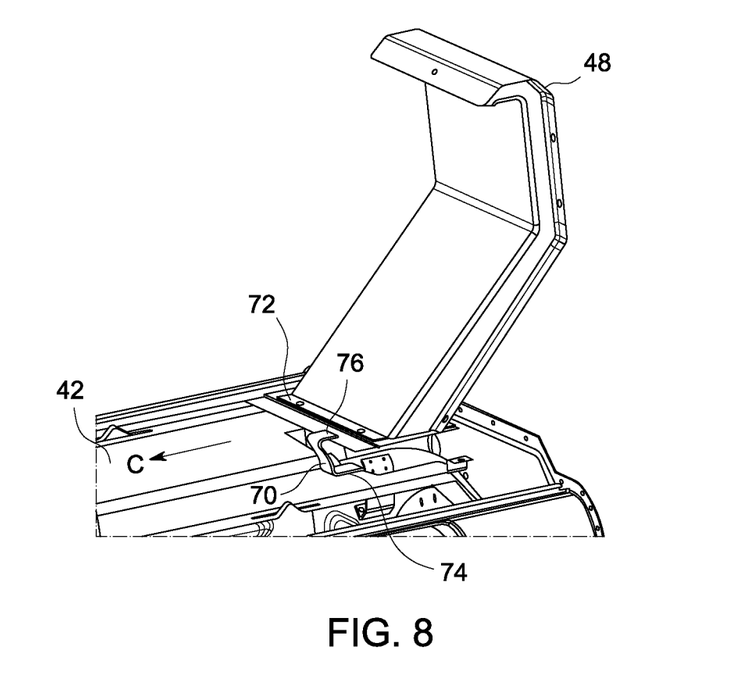
FIG. 8 illustrates the damper system of FIG. 6 is an actuated state.

FIG. 6 illustrates a state of the damper system 50, where the bimetal member 70 is not actuated. FIG. 8 illustrates the bimetal member 70 in the actuated state and the movement of the shutter member 72 in the direction indicated by the arrow C. As the bimetal member 70 expands, the end 76 that is attached to the shutter member 72 pulls the shutter member 72 in the direction indicated by the arrow C. Although the embodiment in shown in this example illustrates the bimetal member 70 "pulling" the shutter member 72 in the direction indicated by the arrow C to reduce the restriction of the vent opening 52, in alternate embodiments, the bimetal member 70 can be configured to "push" the shutter member 72 to restrict the vent opening 52.

Figure 7:
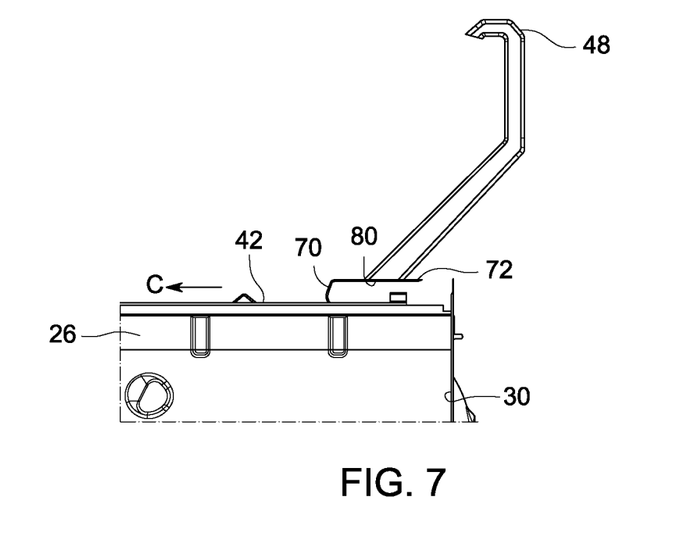
FIG. 7 is a side cross-sectional side view of the damper system of FIG. 6.

In the embodiment where the damper system 50 is configured to restrict the size of the vent opening, referring to FIG. 7, the shutter member 72 includes an opening 80 that is approximately the same size as the vent opening 52. When the bimetal provides a 100% open state during warm up from a cold start, and a 50% opening when steady state temperature conditions are established, when the shutter member 70 is not actuated, the opening 80 in the shutter member 72 is generally aligned with the opening 52 of the exhaust vent 48 so as to not restrict or obstruct the vent opening 52. As the oven cavity 20 heats up, and the bimetal member 70 is actuated, the shutter member 72 is configured to slide across and restrict the vent opening 52, to achieve, for example, the approximately 50% open state of the exhaust vent, as earlier described herein.

In one embodiment, referring to FIGS. 6 and 8-10, the size of the vent opening 52 increases to increase the cross-sectional area of the exhaust vent 48 when the broil burner 40 is on. In this embodiment, the shutter member 72, prior to actuation of the bimetal member 70, at least partially restricts the vent opening 52. With reference to Table 1, this restricted state can be sufficient for steady state operation of the bake burner 36 only. When the broil burner 40 is on, and the bimetal member 70 is actuated, the shutter member 72 moves in the direction E shown in FIGS. 9 and 10.

Figure 9:
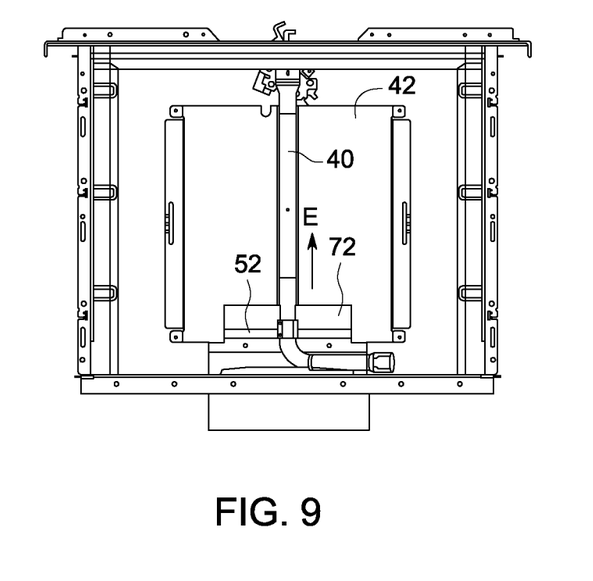
FIGS. 9 and 10 illustrate a cross-sectional, bottom up view of the appliance shown in FIG. 1 incorporating the damper system shown in FIG. 6.
Figure 10:
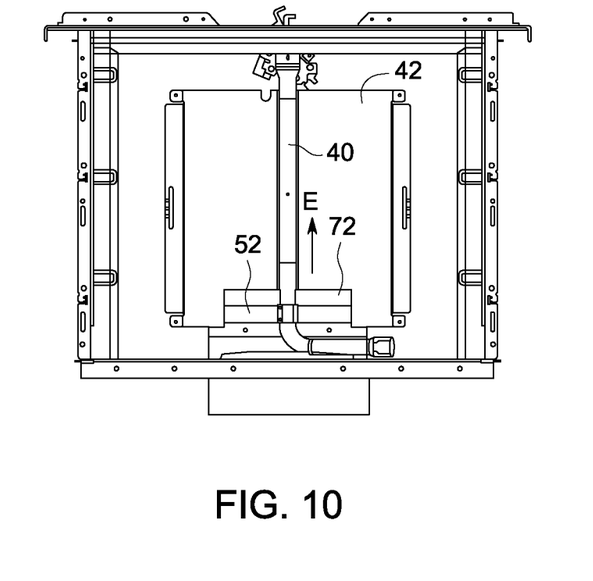

FIGS. 9 and 10 illustrate a bottom up view of the oven cavity 8, showing the broil burner 40, flame spreader 42, and exhaust vent opening 52. FIG. 9 illustrates an initial state of the shutter member 72 and vent opening 52. As shown in FIGS. 9 and 10, the size of the vent opening 52 increases as the shutter member 72 moves in the direction E, thus increasing the available venting for this active state of the broil burner broil burner 40. This aspect of the disclosed embodiments allows the expansion of the effective venting for the broil burner 40 only when the additional venting is needed. Once the broil burner 40 is turned off, the bimetal member 70 will cool, causing the shutter member 72 to move in a direction opposite that indicated by the arrow E, and restrict the area of the vent opening 52, as shown in FIG. 9, thus reducing the cross-sectional area of the exhaust vent 48.

Figure 11:
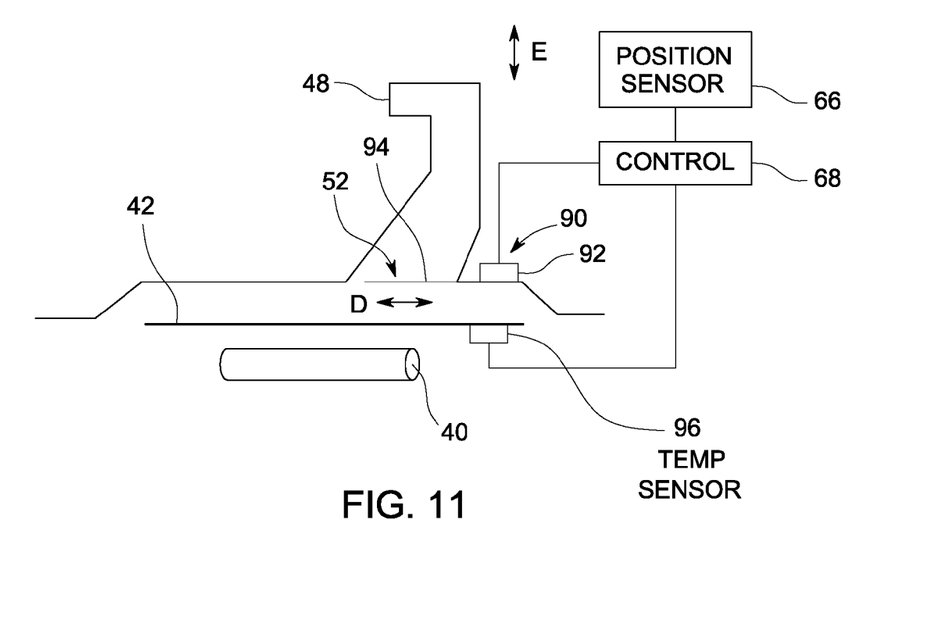
FIG. 11 illustrates an electromechanical damper system according to an embodiment of the present disclosure.

Referring to FIG. 11, in one embodiment, the damper system 50 comprises an electromechanical damper system 90. The electromechanical damper system 90 generally comprises a solenoid/motor-drive damper system that can move the damper plate 94 to restrict and open the vent opening 52. A diagnostic feedback system can confirm the position of the damper plate 94.

In this embodiment, the electromechanical damper system 90 includes the position sensor 66, a controller 68, a damper actuator 92 and a damper member or plate 94. The damper actuator 92 can be configured to move the damper member or plate 94 in the directions generally indicated by arrow D. Although the aspects of the disclosed embodiments generally shown the damper plate 94 moving in a side-to-side direction, in alternate embodiments, the damper actuator 92 can be configured to move the damper plate 94 in an up-and-down direction, such as that indicated by arrow E. As the damper plate 94 moves upwards in the exhaust vent 48, the venting area is restricted. The damper plate 94 moves downwards when more venting is required. In another embodiment, the damper plate 94 can be pivoted about an axle, similar to a throttle plate in an automobile, to open or restrict the vent opening 52.

The damper actuator 92 generally comprises any suitable device that can be used to move or position the damper plate 48 within the exhaust vent 48 in order to increase or decrease the flow of flue gas through the exhaust vent 48. In one embodiment, the damper actuator 92 comprises any one or more of a solenoid, rotary motor, linear motor, electrically heated bi-metallic or a memory wire.

The position sensor 66 is configured to determine a position of the damper member 94 when heat is called for in the oven cavity 20. The controller 68 can be configured to direct the damper actuator 92 to move the damper member 94 from an open position, where the vent opening 52 is substantially not restricted, to a closed position where the vent opening 52 is substantially restricted, as well as any position between the two. In one embodiment, the vent opening 52 can be configured to have a sufficient opening when the damper member 94 is in the closed position to provide sufficient venting airflow for clean, steady state combustion.

In the pre-heat stage of the oven cavity 20, also referred to as cold start combustion, the damper member 94 can be positioned so that the vent opening 52 is fully open. If the damper member 94 is not in proper position when heat is called during one of the modes illustrated in Table 1, the heating of the oven cavity 20 will be prevented. Thus, if a user activates the oven 8 and the damper member 94 is not in, or cannot be repositioned to the proper position, the heating of the oven cavity 20 will be prevented. This adds additional robustness to the appliance 100 in terms of safety in the event the damper system 50 fails to open during the pre-heat or cold combustion phase of the oven 8.

Once the oven cavity 20 is heated to a pre-determined temperature, the controller 68 can be configured to command the damper actuator 92 to at least partially close the vent opening 52 by positioning or extending the damper member 94 into the opening 52. In this manner, the damper system 90 can electronically control the damper member 64 to restrict the venting once the oven cavity 20 reaches the desired operating temperature in order to improve steady state efficiency. The damper member 94 can be configured to substantially close off the vent opening 52 when the gas supply to the oven 8 is off and/or after a cool-down period.

Referring again to FIG. 11, in one embodiment, the damper system 90 can include a temperature sensor 96. The temperature sensor 96 is thermally coupled to a suitable location within the oven cavity 20 of FIG. 1, for determining a temperature within the oven cavity 20. In one embodiment, the temperature sensor 96 is thermally coupled to the flame spreader 42, for example. Additionally a second temperature sensor could be provided to sense the ambient temperature in the oven cavity, or the temperature of the flue gases to enable control of vent size for warm-up operation and broiler operation. The controller can be configured to control vent size in response to temperature sensor 96 when the oven is operating in a broiler mode and in response to the second temperature sensor when operating in a bake mode to support warm up from a cold start. The temperature sensors can comprise any suitable temperature sensing device, such as for example, a thermocouple, a resistance temperature device, an Infrared device, or a semiconductor (e.g., diode or transistor) temperature sensing device.

In one embodiment, the controller 68 is configured to monitor a temperature signal provided by the temperature sensor 96. When a pre-determined temperature is reached, the controller 68 can engage the damper actuator 92 to regulate the position of damper plate 94, as has been described herein.

The aspects of the disclosed embodiments provide for controlling a size of an exhaust vent for a gas operated oven in order to increase oven efficiency. By being able to control the effective size of vent, oven efficiency can be improved by reducing heat losses through the oven vent while maintaining proper combustion. A damper system is positioned near the opening to the exhaust vent from the oven. The damper system can expand or restrict the size of the exhaust vent depending on operating conditions of the oven. During a pre-heat operation, the damper system can increase the size of the exhaust vent to accommodate the cold start combustion conditions. Once an acceptable combustion state is reached, the damper system is configured to restrict the size of the opening to the exhaust vent. A bimetal device or electronic actuator can be configured to actuate when a certain temperature or temperature range is reached. The actuation of the bimetal device or electronic actuator will cause a damper member to either increase a size of the exhaust vent opening or at least partially obstruct the opening to the exhaust vent.

Thus, while there have been shown, described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gas oven comprising;
   an oven cavity;
   a gas burner assembly comprising a broil burner disposed within the oven cavity, and a bake burner;
   an exhaust vent communicatively coupled to the oven cavity, the exhaust vent including an opening to allow flue gas to be vented from the oven cavity through the exhaust vent;
   a damper device disposed proximate to the exhaust vent opening, the damper device being configured to change a size of the opening when the damper device is actuated; and
   a flame spreader disposed above the broil burner, wherein the damper device is thermally coupled to the flame spreader.

2. The gas oven of claim 1, wherein the damper device comprises:
   a bi-metal device; and
   a damper member coupled to the bi-metal device, the bi-metal device being configured to move the damper member to change the size of the opening to the exhaust vent when the bi-metal device is actuated.

3. The gas oven of claim 2, wherein the bi-metal device comprises a bi-metallic strip having a first end and a second end, the shape of the bi-metallic strip being substantially curved, and the damper member being coupled to an outwardly curved side of the bi-metallic strip.

4. The gas oven of claim 2, wherein the damper device comprises a bi-metallic member, one end of the bi-metallic member being fixedly secured in place and another end at least partially disposed in the exhaust vent opening, the other end being movable and configured to move from a normally open position to a closed position when the bi-metallic strip is engaged, the exhaust vent opening being at least partially restricted when the movable end is in the closed position.

5. The gas oven of claim 1, wherein the damper device comprises:
   a bi-metallic member having a first end and a second end; and
   a shutter member slidingly retained in the exhaust vent, wherein the first end of the bi-metallic member is fixedly secured to the oven cavity and the second end is coupled to the shutter member, the bi-metallic member being configured to move the shutter member across the exhaust vent opening to change a size of the opening when the bi-metallic member is actuated.

6. The gas oven of claim 5, wherein
the damper device is thermally coupled to the flame spreader for actuation in response to the temperature of the flame spreader.

7. The gas oven of claim 6, wherein the shutter member is configured to increase the size of the opening when the bi-metallic member is actuated.

8. The gas oven of claim 6, wherein the shutter member is configured to restrict the size of the opening when the bi-metallic member is actuated.

9. The gas oven of claim 6, wherein the bi-metallic member is calibrated to actuate only when the broil burner is active.

10. The gas oven of claim 1, further comprising a controller and a position sensor coupled to the controller, the position sensor being configured to detect a positional state of the damper device, the controller being configured to restrict cold start operation of the gas oven when the positional state of the damper device is at least partially restricting the venting of flue gas through the exhaust vent.

11. The gas oven of claim 1, wherein the damper device comprises:
a temperature sensor configured to detect a temperature within the oven cavity;
a controller electrically coupled to the temperature sensor; and
a damper plate controlled by an actuator, the actuator being electrically coupled to the controller and configured to control the size of the opening to the exhaust vent by moving the damper plate in the opening in dependence of the temperature sensed by the temperature sensor.

12. The gas oven of claim 1, wherein the damper device comprises:
a temperature sensor configured to detect a temperature within the oven cavity;
a controller electrically coupled to the temperature sensor; and
a damper plate controlled by an actuator, the actuator being electrically coupled to the controller and configured to control the size of the opening to the exhaust vent by moving the damper plate in the opening in dependence of the state of the heat source.

* * * * *